United States Patent
Naick et al.

(10) Patent No.: US 7,818,385 B2
(45) Date of Patent: Oct. 19, 2010

(54) METHOD AND APPARATUS FOR FORWARDING EMAILS TO PREVIOUS RECIPIENTS

(75) Inventors: Indran Naick, Cedar Park, TX (US); Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 11/940,058

(22) Filed: Nov. 14, 2007

(65) Prior Publication Data

US 2009/0125596 A1    May 14, 2009

(51) Int. Cl.
G06F 15/16    (2006.01)
G06Q 10/00    (2006.01)
H04L 12/58    (2006.01)

(52) U.S. Cl. .................. 709/206; 715/205; 715/206
(58) Field of Classification Search .................. 709/206
See application file for complete search history.

(56) References Cited

U.S. PATENT DOCUMENTS

| | | | |
|---|---|---|---|
| 5,809,232 A | | 9/1998 | Johnson et al. |
| 5,905,863 A | * | 5/1999 | Knowles et al. ............. 709/206 |
| 6,496,853 B1 | | 12/2002 | Klein |
| 6,631,398 B1 | | 10/2003 | Klein |
| 6,691,153 B1 | * | 2/2004 | Hanson et al. .............. 709/204 |
| 6,816,885 B1 | | 11/2004 | Raghunandan |
| 6,823,368 B1 | | 11/2004 | Ullmann et al. |
| 6,904,435 B2 | * | 6/2005 | Jenkins et al. ................ 707/10 |
| 6,963,904 B2 | * | 11/2005 | Yong ........................... 709/207 |
| 7,035,903 B1 | | 4/2006 | Baldonado |
| 7,444,374 B1 | * | 10/2008 | Baker ......................... 709/206 |
| 7,461,151 B2 | * | 12/2008 | Colson et al. ............... 709/227 |
| 7,539,763 B2 | * | 5/2009 | Toyota et al. ............... 709/229 |
| 7,568,008 B2 | * | 7/2009 | Jain et al. .................... 709/206 |
| 2003/0163537 A1 | | 8/2003 | Rohall et al. |
| 2003/0233419 A1 | * | 12/2003 | Beringer ...................... 709/206 |
| 2004/0025057 A1 | * | 2/2004 | Cook .......................... 713/201 |
| 2004/0111612 A1 | * | 6/2004 | Choi et al. ................... 713/163 |
| 2004/0254989 A1 | | 12/2004 | Baratakke et al. |

(Continued)

OTHER PUBLICATIONS

Carenini et al., "Scalable Discovery of Hidden Emails from Large Folders", Proceedings of the ACM SIGKDD International Conference on Knowledge Discovery and Data Mining, 2005, pp. 544-549.

*Primary Examiner*—Ashok B Patel
*Assistant Examiner*—Joseph Gazda
(74) *Attorney, Agent, or Firm*—Yee & Associates, P.C.; Justin M. Dillon

(57) ABSTRACT

The illustrative embodiments of the present invention described herein provide a computer implemented method, apparatus, and computer program product for forwarding a reply email message. The process dynamically inserts email addresses associated with a plurality of recipients of an original email message and with an email address associated with the sender of the original email message into a recipient field of the reply email message. The email address associated with the sender of the original email message is identified to form an identified email address, wherein a copy of the reply email message is unsent to the identified email address. However, the identified email address remains part of the recipient field. In response to receiving a send command, the reply email message is sent to the email addresses associated with the recipient field excluding the identified email address.

20 Claims, 4 Drawing Sheets

U.S. PATENT DOCUMENTS

| | | | |
|---|---|---|---|
| 2005/0027779 A1* | 2/2005 | Schinner | 709/200 |
| 2005/0108402 A1 | 5/2005 | Colson et al. | |
| 2005/0144157 A1 | 6/2005 | Moody et al. | |
| 2006/0036696 A1* | 2/2006 | Maresh | 709/206 |
| 2006/0143274 A1 | 6/2006 | Schulz et al. | |
| 2007/0011255 A1 | 1/2007 | Miyamoto | |
| 2007/0073871 A1* | 3/2007 | Adams et al. | 709/224 |
| 2008/0120383 A1* | 5/2008 | Kumar et al. | 709/206 |
| 2009/0089382 A1* | 4/2009 | Garrett | 709/206 |

\* cited by examiner

METHOD AND APPARATUS FOR FORWARDING EMAILS TO PREVIOUS RECIPIENTS

BACKGROUND OF THE INVENTION

1. Field of the Invention

The present invention relates generally to an improved data processing system and method for forwarding electronic mail (email). Still more particularly, the present invention relates to a computer implemented method, apparatus, and computer program for forwarding emails to a list of previous recipients.

2. Description of the Related Art

Electronic data communications, particularly electronic mail (email), is increasingly prevalent for both business and personal uses. Email services may be offered to users by Internet service providers (ISPs). Such businesses host a user's email account providing the user with a mailbox and a user interface with which to send and receive emails. For example, an America Online (AOL) customer uses AOL's email reader.

Many people use well known, stand-alone email applications, such as Microsoft Outlook®, Outlook Express®, or Thunderbird® to organize, send, and receive emails. People who subscribe to free email services like Hotmail® or Yahoo® use an email interface that appears in a Web page. Outlook®, Outlook Express®, and Hotmail® are products and trademarks of Microsoft Corporation. Thunderbird® is a product and trademark of the Mozilla Corporation.

Most email applications provide functionality that allows a user to reply only to the sender of an email or reply to all recipients of the email including the sender of the email. A common mistake that occurs is a user accidentally replies only to the sender of the email when the user, in fact, intended to send a reply to all recipients of the email including the sender. This is typically done by hitting "reply to" instead of "reply-to-all" and is consistent to all major email platforms. Similarly, a user may intentionally send a reply email only to the sender but later desires to resend the reply email to all recipients originally included on the original email.

Currently, there is no elegant method of forwarding the replied email to all recipients initially included on the original email. The user may go back to the original email, hit reply-to-all and paste in the replied text. The problem with this solution is that the original sender receives duplicate replies causing confusion. Furthermore, the original sender may have already responded to the reply.

Alternatively, the user may manually forward the replied email and paste in the other individuals as recipients. The problem with this solution is that the original sender is left off of the recipient list. Thus, the original sender will not receive any replies to the forwarded email if a recipient of the forwarded email sends a reply-to-all response. Furthermore, if the original sender responds to the replied email, the other recipients do not receive the response email.

Accordingly, the illustrative embodiments of the present invention recognize the problems presented above and provide a solution.

SUMMARY OF THE INVENTION

The illustrative embodiments of the present invention described herein provide a computer implemented method, apparatus, and computer program product for forwarding an email message. In response to receiving a request to forward an email message, a determination is made as to whether the email message is a reply email message. A reply email message is an email message sent in response to an original email message and is sent only to the sender of the original email message. In response to determining that the message is a reply email message, a determination is made as to whether the original email message was sent to a plurality of recipients. In response to determining that the original email message was sent to a plurality of recipients, email addresses associated with the plurality of recipients and an email address associated with the sender of the original email message is inserted into the recipient field of the reply email message. The email address associated with the sender of the original email message is identified to form an identified email address, wherein a copy of the reply email message is unsent to the identified email address. However, the identified email address remains part of the recipient field. In response to receiving a send command, the reply email message is sent to the email addresses associated with the recipient field excluding the identified email address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
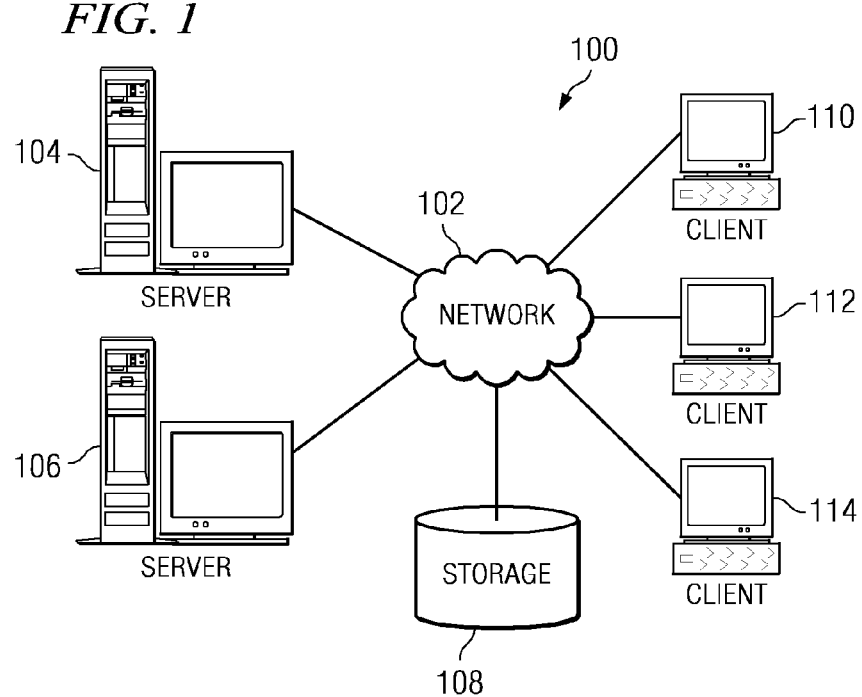
FIG. 1 is a pictorial representation of a network of data processing systems in which illustrative embodiments of the present invention may be implemented.
Figure 2:
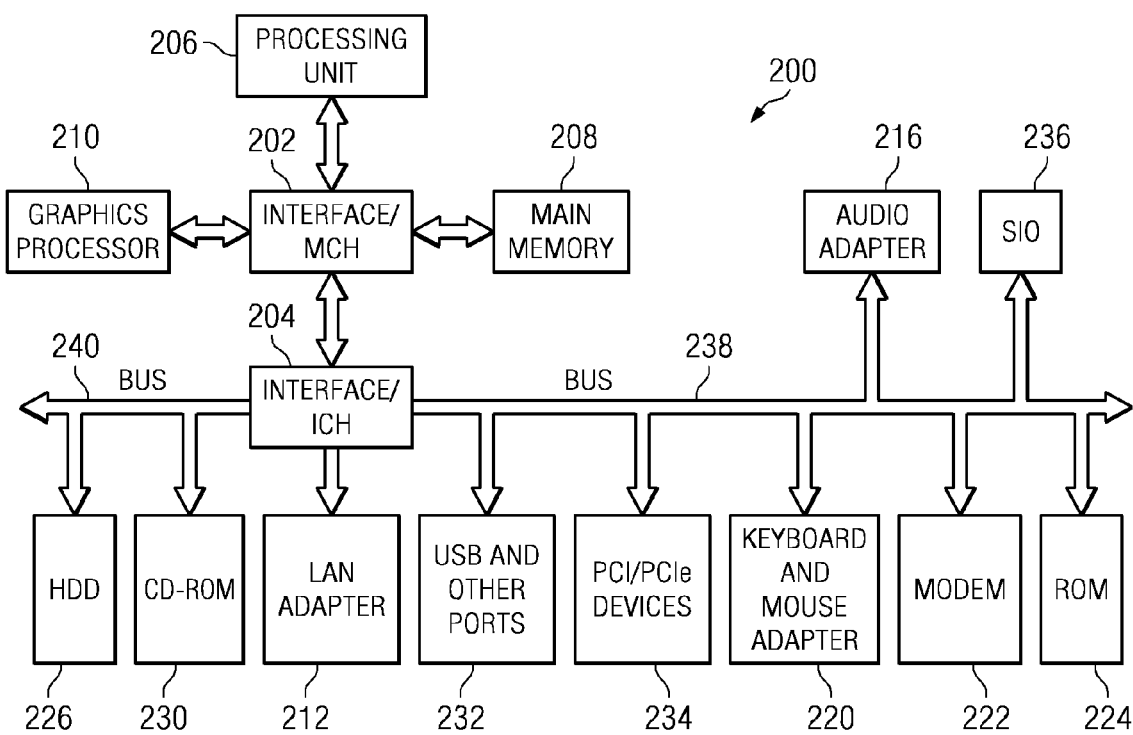
FIG. 2 is a block diagram of a data processing system in which illustrative embodiments of the present invention may be implemented.

With reference now to the figures, and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. The illustrative embodiments of the present invention may be implemented in a data processing system, such as clients 110, 112, and 114. For example, an email application in accordance with illustrative embodiments of the present invention may be executed on Client 110. The email application may forward a reply email message stored on server 104, using network 102, to another data processing system, such as client 112. Additionally, clients 110, 112, and 114 may use an Internet browser to communicate with server 104. Network data processing system 100 may include additional servers, clients, and other devices not shown.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments of the present invention may be implemented. Data processing system 200 is an example of a computer, such as directory server 104, in which computer usable code or instructions implementing the processes may be located for the illustrative embodiments of the present invention.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments of the present invention may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Email messages are essentially text documents, stored either remotely on a file system, such as a file system on server 104, or in a local data store on a data processing system, such as client 110. Furthermore, email messages are formatted in such a way that a computer implemented method, as will be presented by the illustrative embodiments of the present invention, can modify the email message. In particular, modification to the recipient field is possible. In addition, replied emails are structured in such a way that a computer implemented method, as will be presented by the illustrative embodiments of the present invention, is able to navigate to earlier emails and their recipient list.

Therefore, the illustrative embodiments of the present invention described herein provide a computer implemented method, apparatus, and computer program product for forwarding an email message. The method is implemented in an email application running on a data processing system such as data processing system 200 as shown in FIG. 2. In response to receiving a request to forward an email message, a determination is made as to whether the email message is a reply email message. A reply email message is an email message sent in response to an original email message and is sent only to the sender of the original email message. In response to determining that the message is a reply email message, a determination is made as to whether the original email message was sent to a plurality of recipients. In response to determining that the original email message was sent to a plurality of recipients, the recipient field associated with the reply email message is dynamically populated with the email addresses associated with the plurality of recipients and with an email address associated with the sender of the original email message. The email address associated with the sender of the original email message is identified to form an identified email address, wherein a copy of the reply email message is unsent to the identified email address. However, the identified email address remains part of the recipient field. In response to receiving a send command, the reply email message is sent to the email addresses associated with the recipient field excluding the identified email address.

Figure 3:
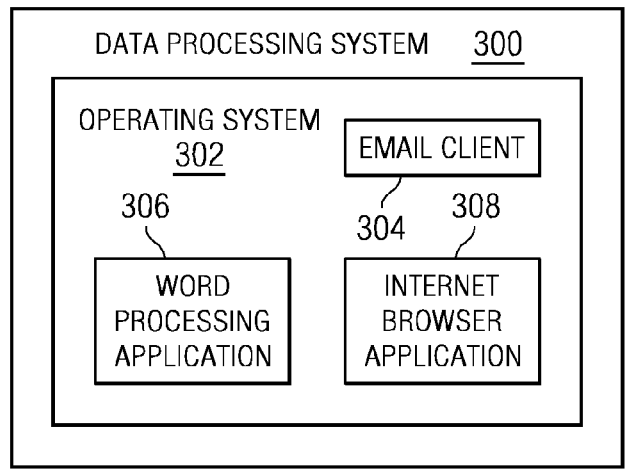
FIG. 3 is a block diagram depicting components of a data processing system in which illustrative embodiments of the present invention may be implemented.

With reference now to FIG. 3, a block diagram depicting components of a data processing system in which illustrative embodiments of the present invention may be implemented is presented. Data processing system 300 may be implemented in a data processing system, such as a client 110 shown in FIG. 1, or data processing system 200 shown in FIG. 2.

Operating system 302 runs on data processing system 300. Operating system 302 may be a commercially available operating system such as, but not limited to, Microsoft® Windows® XP. The illustrative embodiments of the present invention may be implemented in an email application, such as email application 304, running on operating system 302. Email application 304 may be any commercially available email application, such as, but not limited to, Microsoft Outlook®, Outlook Express®, and Thunderbird®. Email application 304 may also be an internal proprietary email application. Furthermore, email application 304 may be a standalone email application or may be a web based email application. Operating system 302 may run other software applications, such as, but not limited to, a word processing application 306 and an Internet browser application 308.

Figure 4:
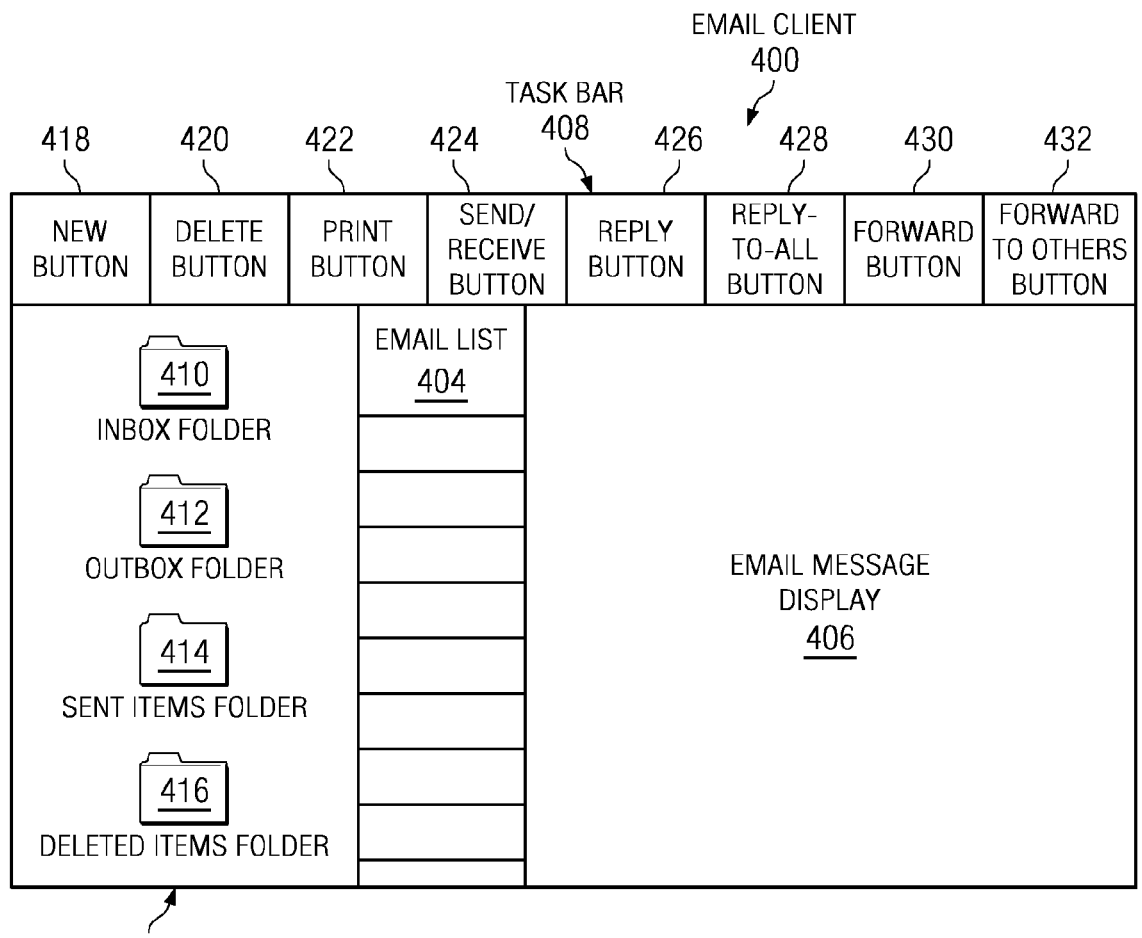
FIG. 4 illustrates a graphical user interface associated with an email application in accordance with illustrative embodiments of the present invention.

FIG. 4 is an example of a graphical user interface associated with an email application in accordance with illustrative embodiments of the present invention. Window 400 is a graphical user interface that may be associated with an email application, such as email application 304 as depicted in FIG. 3. Other embodiments of window 400 may exist. A processing unit, such as processing unit 206 on data processing system 200 as depicted in FIG. 2, executes computer usable program code to generate window 400 and execute the functions associated with window 400.

Window 400 comprises of folders menu 402, email list 404, email message display 406, and task bar 408. Folders menu 402 displays set of folders for organizing email messages. In this example, folders menu 402 contains inbox folder 410, outbox folder 412, sent items folder 414, and deleted items folder 416. Inbox folder 410 stores and organizes all received emails. Outbox folder 412 stores outgoing emails that are waiting to be sent. Once the outgoing emails are sent, the emails are stored in sent items folder 414. Deleted items folder 416 store emails that have been deleted out of inbox folder 410 but have not been permanently deleted.

Email list 404 displays a list of the emails contained in a selected folder, such as inbox folder 410. The list may be arranged by chronological order or may be arranged in some other manner associated with a user's preference. Typically, the list of emails displays the name of the sender of the email, a subject line, and the date/time the email was received.

Email message display 406 displays the body/text of a selected email. Email message display 406 may also display the name of the sender of the email, a subject line, attachments, and the date/time the email was received. Email message display 406 may also be the area where a user drafts new messages or responds to a previously received email message. Alternatively, the user may draft a new message or respond to a previously received email message in a different window.

Task bar 408 displays buttons for performing email related tasks. For example, task bar 408 contains new button 418, delete button 420, print button 422, send/receive button 424, reply button 426, reply-to-all button 428, forward button 430, and forward to others button 432. New button 418 is used to generate a new email message. Delete button 420 is used to delete a selected email message. Print button 422 is used to print a selected email message. Send/receive button 424 is used to initiate the sending and receiving email process. Reply button 426 is used to reply to the sender of a selected email message. Reply-to-all button 428 is used to reply-to-all recipients of a selected email message including the sender of the selected email message. Forward button 430 is used to forward a selected email message to a person that did not receive the selected email message.

The illustrative embodiments of the present invention may be implemented in the forward to others button 432. Forward to others button 432 is used to forward a prior email response, which was only sent to the original sender, to the other recipients of the original email message. The email addresses of the original sender and the other recipient are inserted in the recipient field of the email message. However, the email address associated with the original sender is marked such that the processing server does not send a copy of the reply to the original sender because a previous copy of the reply had already been sent. Marking the email address associated with the original sender may be accomplished by placing tags around the email address. The tags indicate to the processing server that the email address identified within the tags should not be sent a copy of the reply. When a recipient of the reply email message replies to all, the original sender receives the new reply because has been added to the list of recipients.

Additionally, as will be further described below, an update email message is sent to the original sender requesting permission to update the recipient list of the previously sent reply with the email addresses associated with all the other recipients of the original email.

Figure 5:
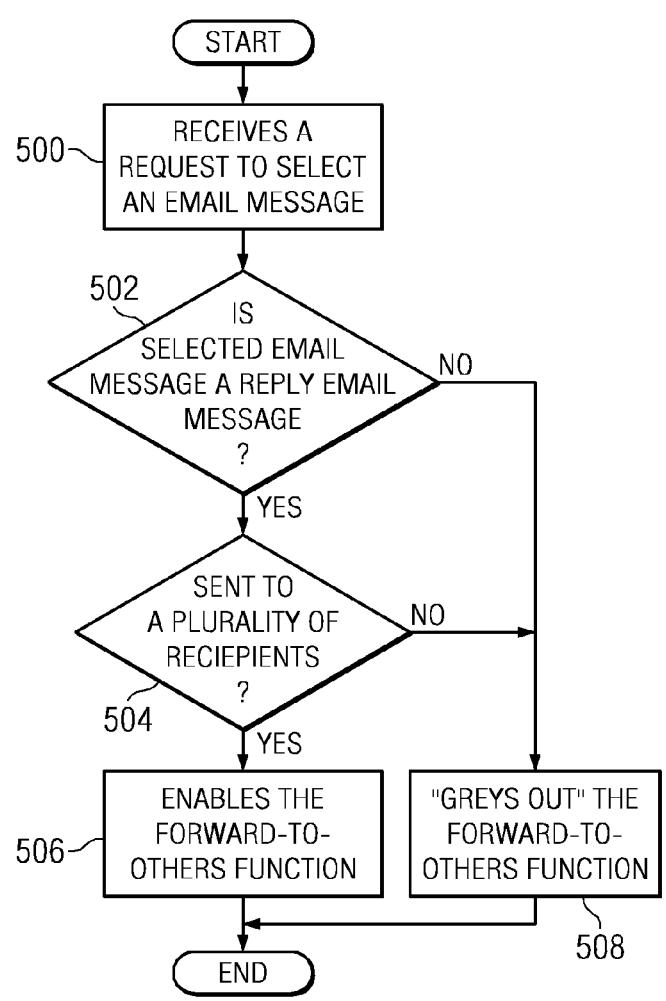
FIG. 5 is a flowchart illustrating a process for enabling the forward-to-others function in accordance with illustrative embodiments of the present invention.

FIG. 5 is a flowchart illustrating a process for enabling the forward-to-others function in accordance with illustrative embodiments of the present invention. The process in FIG. 5 may be implemented in an email application, such as, email application 304, as depicted in FIG. 3.

The process begins by receiving a request to select an email message (process block 500). The process determines if the selected email message is a reply email message (process block 502). A reply email message is an email message sent in response to a prior email message and is sent only to the sender of the prior email message. In most email applications, a reply message is produced in response to a user selecting the "Reply" function, such as Reply button 426 shown in FIG. 4.

In response to determining that the message is reply email message, the process determines if the prior email message was sent to a plurality of recipients (process block 504). A plurality of recipients is two or more recipients. If the prior email message was sent to a plurality of recipients, the process enables the forward-to-others function (process block 506), with the process terminating thereafter.

However, if the selected email message is determined to be not a reply message, at process block 502, or was not sent to a plurality of recipients, at process block 504, the process "greys out" the forward-to-others function (process block 508), with the process terminating thereafter. Greying out means the function is not available, typically indicated by greying the text on a button.

Figure 6:
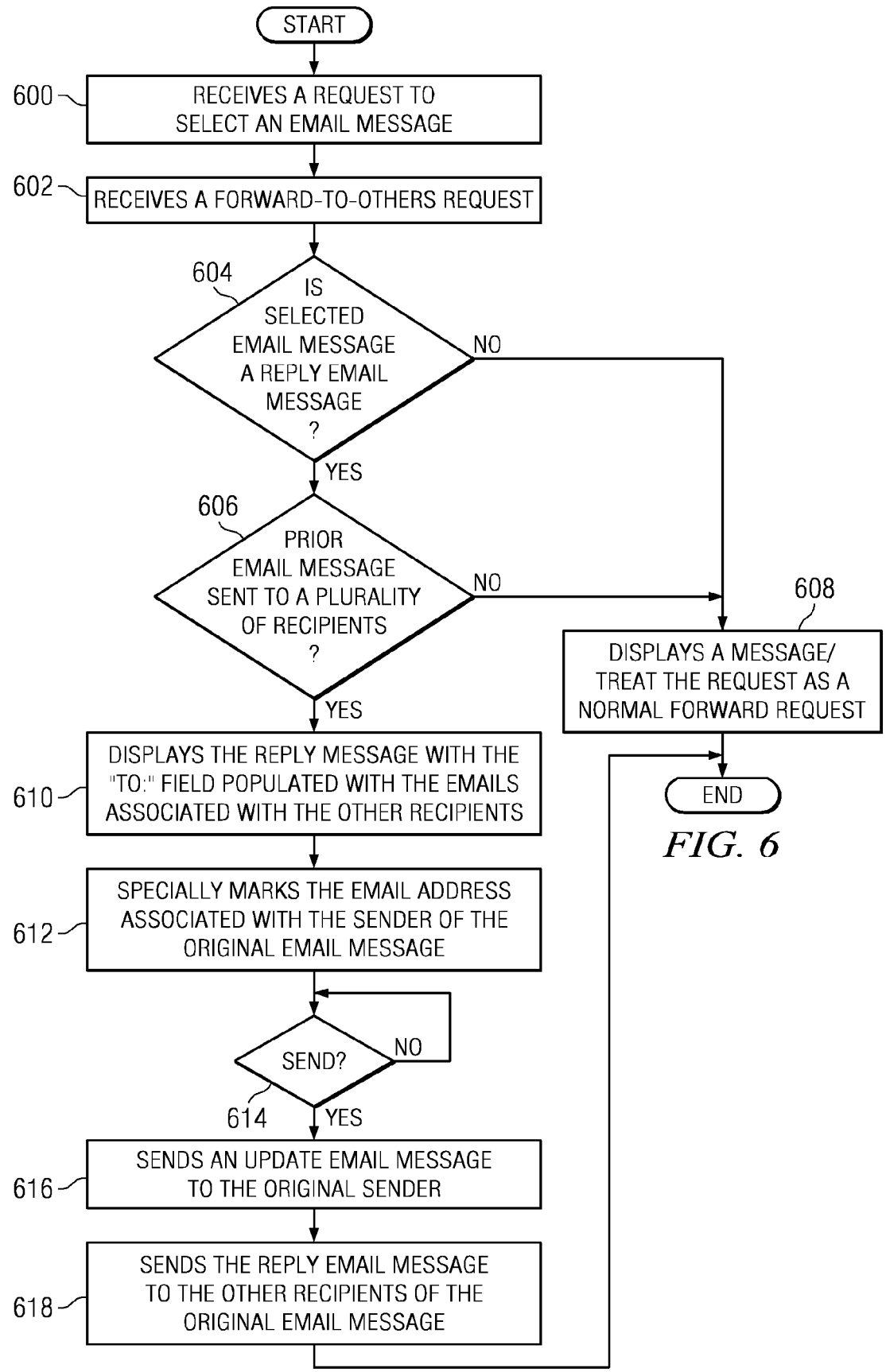
FIG. 6 is a flowchart illustrating a process for forwarding a prior email response in accordance with illustrative embodiments of the present invention.

In another illustrative embodiment, the forward-to-others function is always enabled. For example, FIG. 6 illustrates such an embodiment. FIG. 6 is a flowchart illustrating a process for forwarding a prior email response in accordance with illustrative embodiments of the present invention. The process in FIG. 6 may be implemented in an email application, such as, email application depicted 304, as depicted in FIG. 3.

The process begins by receiving a request to select an email message (process block 600). The process then receives a forward-to-others request (process block 602). The process determines if the selected email message is a reply email message (process block 604). In response to determining that the message is reply email message, the process determines if the prior email message was sent to a plurality of recipients (process block 606). If the process determines that the selected email message is not a reply message, at process block 604, and\or was not sent to a plurality of recipients, at process block 606, the process displays a message indicating such determination (process block 608). Alternatively, the process may treat the request as a normal forward request. A normal forward request would display the selected email message with the recipient field empty.

In response to a determination that the prior email message was sent to a plurality of recipients, the process displays the reply message with the recipient field populated with the email addresses associated with the other recipients within the plurality of recipients (process block 610). Additionally, the email associated with the sender of the original email message is inserted in the recipient field of the reply message. Therefore, if a recipient of the reply message replies-to-all, the sender of the original email message gets such reply.

However, because the sender of the original email message previously received the reply email message, the process marks the email address associated with the sender of the original email message in such a way that the processing server does not re-send the reply email message to the original sender (process block 612). The process then waits for a send request (process block 614). The user may draft any additional message to the reply email message prior to pressing the "send" function, such as send/receive button 424 shown in FIG. 4. In response to receiving a send request, the process sends an update email message to the original sender (process block 616). The process then sends the reply email message to the other recipients of the original email message (process block 618), with the process terminating thereafter.

Figure 7:
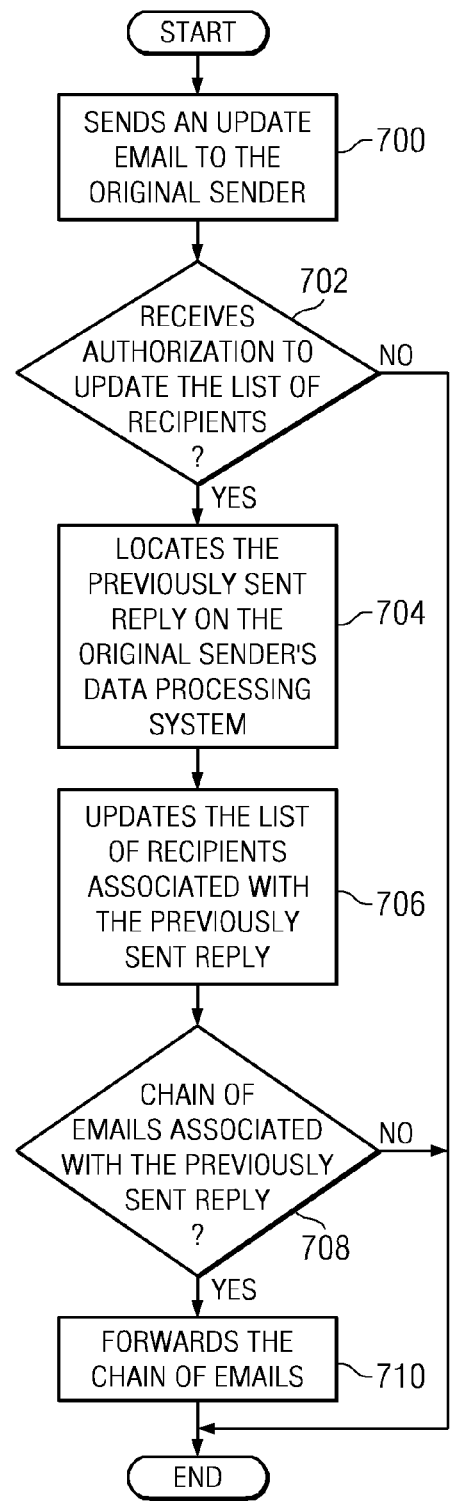
FIG. 7 is a flowchart illustrating a process for updating a prior email response in accordance with illustrative embodiments of the present invention.

With reference now to FIG. 7, a flowchart illustrating a process for updating a prior email response in accordance with illustrative embodiments of the present invention. The process in FIG. 7 may be implemented in an email application, such as, email application 304, as depicted in FIG. 3.

The process begins by sending an update email to the original sender (process block 700). The update email requests authorization from the original sender to update the list of recipients associated with the previously sent reply. The process waits for authorization (process block 702).

In response to receiving authorization to update the list of recipients associated with the previously sent reply, the process locates the previously sent reply on a data processing system associated with the original sender (process block 704). The process updates the list of recipients associated with the previously sent reply with the email addresses associated with the other recipients of the original email message (process block 706). The process then determines whether a chain of emails associated with the previously sent reply exists (process block 708). A chain of emails are emails that were sent in response to the previously sent reply email message prior to the process updating the list of recipients.

The process then forwards the chain of emails associated with the previously sent reply, if any, to the newly added list of recipients (process block 710), with the process terminating thereafter. Thus, any new reply-to-all response to the original reply email message will be sent to all recipients of the original email message.

Thus, the illustrative embodiments of the present invention described herein provide a computer implemented method, apparatus, and computer program product for forwarding an email message. In response to receiving a request to forward an email message, a determination is made as to whether the email message is a reply email message. A reply email message is an email message sent in response to an original email message and is sent only to the sender of the original email message. In response to determining that the message is a reply email message, a determination is made as to whether the original email message was sent to a plurality of recipients. In response to determining that the original email message was sent to a plurality of recipients, the recipient field associated with the reply email message is dynamically populated with the email addresses associated with the plurality of recipients and with an email address associated with the sender of the original email message. The email address associated with the sender of the original email message is identified to form an identified email address, wherein a copy of the reply email message is unsent to the identified email address. However, the identified email address remains part of the recipient field. In response to receiving a send command, the reply email message is sent to the email addresses associated with the recipient field excluding the identified email address.

The illustrative embodiments of the present invention provide an elegant method of forwarding a reply email message that was not sent to all recipients initially included on an original email. The computer implemented method provides several advantages over the current art. First, an email address associated with the sender of the original email message is included in the recipient filed of the forwarded message. Thus, the original sender will receive any email message that is sent to all recipients in response to the forwarded email. However, the computer implemented method marks the email address associated with the sender of the original email message in such as way that the sender of the original email message does not receive a copy of the forwarded email. Therefore, eliminating confusing and unnecessary duplicate email messages.

Additionally, the illustrative embodiments of the present invention sends an update email message to the sender of the original email message requesting permission to update the sender's email files to add the email addresses associated with the original recipients to the previously sent reply email message. Therefore, any future reply-to-all correspondence will be sent to all the original recipients. Furthermore, the illustrative embodiments of the present invention forwards the chain of emails, if any, associated with the previously sent reply email message to all the original recipients. Accordingly, the illustrative embodiments of the present invention identify problems associated with the current methods of forwarding an email and present an elegant solution to those problems.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for forwarding an email message, the computer implemented method comprising:

receiving a request to forward the email message to form an email message to be forwarded;

automatically determining, by a processing unit, whether the email message to be forwarded was a reply email message, wherein automatically determining that the email message to be forwarded is a reply email message comprises:

determining that the email message to be forwarded was previously sent in response to an original email message; and determining that the email message to be forwarded was only sent to a sender of the original email message;

responsive to a determination that the email message to be forwarded was the reply email message, determining whether the original email message was previously sent to a plurality of recipients;

responsive to a determination that the original email message was previously sent to the plurality of recipients, automatically inserting email addresses associated with each of the plurality of recipients of the original email message and an email address associated with the sender of the original email message into a recipient field of the email message to be forwarded;

automatically identifying the email address associated with the sender of the original email message to form an identified email address, wherein the email message to be forwarded is unsent to the identified email address and wherein the identified email address remains part of the recipient field of the email message to be forwarded; and sending the email message to be forwarded to the email addresses associated with each of the plurality of recipients of the original email message excluding the identified email address to form a forwarded email message.

2. The computer implemented method of claim 1 further comprising:

sending an update email message to the identified email address.

3. The computer implemented method of claim 2 wherein the update email message requests authorization to update a list of recipients associated with the reply email message that was previously sent only to the sender of the original email message.

4. The computer implemented method of claim 3, further comprising:

responsive to receiving the authorization, locating, on a data processing system associated with the sender of the original email message, the reply email message that was previously sent to the sender of the original email message; and updating the list of recipients in the reply email message that was previously sent to the sender of the original email message with the email addresses associated with each of the plurality of recipients.

5. The computer implemented method of claim 4, further comprising:

determining if a chain of emails is associated with the reply email message that was previously sent to the sender, wherein the chain of emails are emails that were sent in response to the reply email message that was previously sent to the sender prior to the step of updating the list of recipients associated with the reply email message; and responsive to a determination that the chain of emails exist, forwarding the chain of emails to the email addresses associated with the plurality of recipients.

6. The computer implemented method of claim 5, further comprising:

requesting authorization to forward the chain of emails to the email addresses associated with the plurality of recipients prior to the step of forwarding the chain of emails.

7. The computer implemented method of claim 1, further comprising:

modifying text associated with the reply email message prior to sending.

8. The computer implemented method of claim 1 wherein the step of determining if the email message is a reply email message is performed prior to the step of receiving a request to forward the email message.

9. The computer implemented method of claim 8, further comprising:

responsive to a determination that the email message is not a reply email address, disabling a command associated with the request to forward the email message.

10. The computer implemented method of claim 1, further comprising:

modifying the recipient field associated with the reply email prior to sending, wherein modifying adds or deletes email addresses to the recipient field.

11. A computer program product comprising:

a non-transitory computer readable storage medium including computer usable program code for forwarding an email message, the computer program product comprising:

computer usable program code for receiving a request to forward the email message to form an email message to be forwarded;

computer usable program code for automatically determining whether the email message to be forwarded was a reply email message, wherein automatically determining that the email message to be forwarded was a reply email message comprises:

computer usable program code for determining that the email message to be forwarded is an email message that was previously sent in response to an original email message; and computer usable program code for determining that wherein the email message to be forwarded was only sent to a sender of the original email message;

computer usable program code for determining whether the original email message was previously sent to a plurality of recipients in response to a determination that the email message to be forwarded was the reply email message;

computer usable program code for automatically inserting email addresses associated with each of the plurality of recipients of the original email message and an email address associated with the sender of the original email message into a recipient field of the email message to be forwarded in response to a determination that the original email message was previously sent to the plurality of recipients;

computer usable program code for automatically identifying the email address associated with the sender of the original email message to form an identified email address, wherein the email message to be forwarded is unsent to the identified email address and wherein the identified email address remains part of the recipient field of the email message to be forwarded; and computer usable program code for sending the email message to be forwarded to the email addresses associated with each of the plurality of recipients of the original email message excluding the identified email address to form a forwarded email message.

12. The computer program product of claim 11 further comprising:

computer usable program code for sending an update email message to the identified email address.

13. The computer program product of claim 12 wherein the update email message requests authorization to update a list of recipients associated with the reply email message that was previously sent only to the sender of the original email message.

14. The computer program product of claim 13, further comprising:

computer usable program code for locating, on a data processing system associated with the sender of the original email message, the reply email message that was previously sent to the sender of the original email message in response to receiving the authorization; and computer usable program code for updating the list of recipients in the reply email message that was previously sent to the sender of the original email message with the email addresses associated with each of the plurality of recipients.

15. The computer program product of claim 14, further comprising:

computer usable program code for determining if a chain of emails is associated with the reply email message that was previously sent to the sender, wherein the chain of emails are emails that were sent in response to the reply email message that was previously sent to the sender prior to the step of updating the list of recipients associated with the reply email message; and computer usable program code for forwarding the chain of emails to the email addresses associated with the plurality of recipients in response to a determination that the chain of emails exist.

16. The computer program product of claim 15, further comprising:

requesting authorization to forward the chain of emails to the email addresses associated with the plurality of recipients prior to the step of forwarding the chain of emails.

17. The computer program product of claim 11, further comprising:

computer usable program code for modifying text associated with the reply email message prior to sending.

18. The computer program product of claim 11 wherein the computer usable program code for determining if the email message is a reply email message is performed prior to the computer usable program code for receiving a request to forward the email message.

19. The computer program product of claim 18, further comprising:

computer usable program code for disabling a command associated with the request to forward the email message in response to a determination that the email message is not a reply email address.

20. An apparatus comprising:

a bus system;

a communications system connected to the bus system;

a memory connected to the bus system, wherein the memory includes computer usable program code; and a processing unit connected to the bus system, wherein the processing unit executes the computer usable program code to:

receive a request to forward the email message to form an email message to be forwarded;

automatically determine whether the email message to be forwarded was a reply email message, wherein to automatically determine that the email message to be forwarded was a reply email message comprises the processing unit executes the computer usable program code to:

determine that the email message to be forwarded was previously sent in response to an original email message; and determine that the email message to be forwarded was only sent to a sender of the original email message;

determine whether the original email message to be forwarded was previously sent to a plurality of recipients in response to determination that the email message was the reply email message;

automatically insert email addresses associated with each of the plurality of recipients of the original email message and an email address associated with the sender of the original email message into a recipient field of the email message to be forwarded in response to a determination that the original email message was previously sent to the plurality of recipients;

automatically identify the email address associated with the sender of the original email message to form an identified email address, wherein the email message to be forwarded is unsent to the identified email address and wherein the identified email address remains part of the recipient field of the email message to be forwarded; and send the email message to be forwarded to the email addresses associated with each of the plurality of recipients of the original email message excluding the identified email address to form a forwarded email message.

* * * * *